Figure 1:
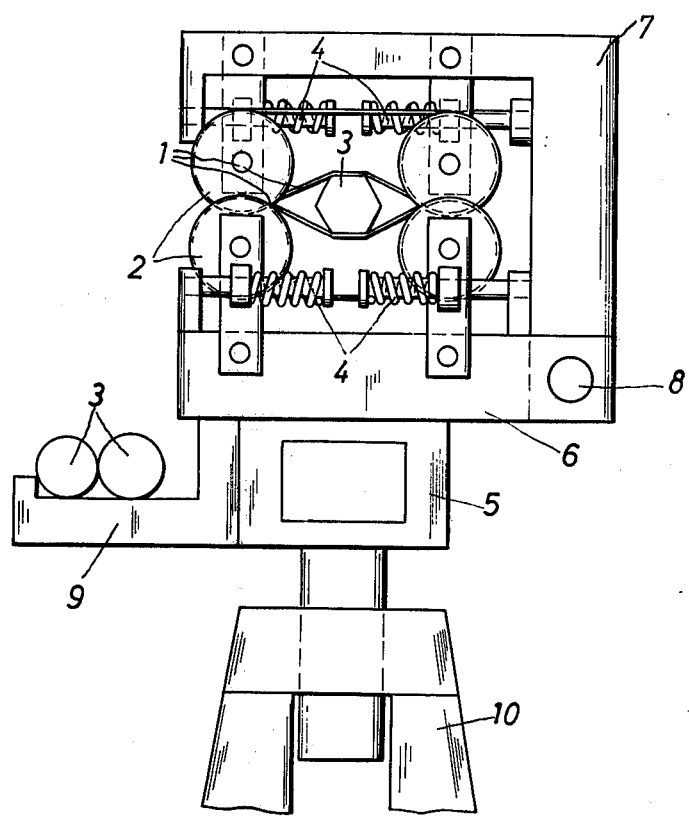

United States Patent [19]

Sewing

[11] 4,179,957

[45] Dec. 25, 1979

[54] APPARATUS FOR DAMPING NOISE IN BAR-FEEDING DEVICES OF SCREW-CUTTING MACHINES

[76] Inventor: Wilhelm Sewing, Hagedorner Str. 151, D 4983 Kirchlengern 3, Fed. Rep. of Germany

[21] Appl. No.: 902,049

[22] Filed: May 2, 1978

[30] Foreign Application Priority Data

May 3, 1977 [DE] Fed. Rep. of Germany ....... 2719687

[51] Int. Cl.² ...................... B23B 13/08; B23B 25/00; B23Q 3/00
[52] U.S. Cl. ................................. 82/38 A; 10/162 R; 226/172
[58] Field of Search ................. 10/162 R; 82/DIG. 9, 82/38 R, 38 A; 226/170, 171, 172; 308/3 R, 3 A, 6 B; 193/25 E, 25 S, 38

[56] References Cited

U.S. PATENT DOCUMENTS

| | | | |
|---|---|---|---|
| 3,251,253 | 5/1966 | Eubanks | 226/172 X |
| 4,000,797 | 1/1977 | Ducanis | 193/38 |
| 4,030,585 | 6/1977 | Ducanis | 82/38 A |
| 4,065,989 | 1/1978 | Scheler | 82/38 A |
| 4,130,035 | 12/1978 | Langley | 82/38 A |

FOREIGN PATENT DOCUMENTS

1288463 9/1972 United Kingdom .................... 82/38 A

*Primary Examiner*—E. M. Combs
*Attorney, Agent, or Firm*—Brown, Flick & Peckham

[57] ABSTRACT

In apparatus for damping noise in bar-feeding devices of automatic screw-cutting machines a group of rollers is composed of an upper pair of laterally spaced upright rollers and a lower pair of laterally spaced upright rollers, with an endless belt extending around each pair and resilient means urging the rollers laterally away from each other to maintain the belts taut. The lower length of the upper belt and the upper length of the lower belt are engageable with the top and bottom of a rotating and axially moving bar between them.

4 Claims, 2 Drawing Figures

APPARATUS FOR DAMPING NOISE IN BAR-FEEDING DEVICES OF SCREW-CUTTING MACHINES

This invention concerns guides for material which takes the form of bars, the guides being mounted on machines in which the bar stock is being processed. More particularly, the invention is concerned with apparatus for damping the noise in bar-feeding devices mounted on screw-cutting machines, especially where the bars have a polygonal profile, the apparatus being provided along the feed axis of the bars with a number of groups of four elastically sprung rollers that serve to hold a bar in a resilient manner on the feed axis and to hold the bar from opposite sides under pressure so that the bar can rotate on the feed axis while being fed over the surface of an endless belt.

Bar material, especially profiled bar stock, when rotated between the guide rollers of automatic screw cutting machines subjects the operating personnel to a considerable amount of noise. A low noise-level bar stock support system should reduce the noise level in automatic screw-cutting plants.

In an attempt to reduce the noise level, metal spirals have been inserted in the feed tubes or the latter have been shrouded with concrete or rubber. However, these measures do not provide adequate noise protection, especially with profiled materials.

A damping device also is known, in which the bar is conveyed between several guide rollers that abut the periphery of the bar and that are covered with a yielding noise-damping material. These guide rollers are mounted in a resilient, yielding manner in groups of three or more rollers along the feed axis of the bar and with their external running faces pressing against the bar. This type of bar feed, in which the bars are fed between rollers whose exteriors are covered with an impact-resilient medium, such as rubber or plastic, displays the following drawbacks:

When polygonal bars are being fed, especially those with larger dimensions, the width between corners must be taken up by the resilient covering on the rollers or by the spring mounting of the rollers. Thus, the surface covering on the rollers becomes very highly stressed and this reduces the service life of the rollers. If the distance between the corners of a bar are large, so that the latter cannot be accommodated by the roller covering, the rollers must carry out a movement at each corner. These movements cause vibrations, which again act as a source of noise. In addition, the rollers must accommodate the entire displacement from the smallest to the largest radius of the bars.

Another fault that can be found resides in the fact that the guiding means do not adjust automatically to the diameter of the bar stock because the rollers are forced toward the middle of the bar directly by means of springs or other resilient means and, in case the coefficient of friction is too great, it is impossible for the bar to move in the axial direction on account of the friction between the rollers and bar being too great. Axial movement is, however, essential for processing the bar. The friction is high because the covering on the rollers must consist of a very elastic material in order to ensure embedding of the corners of the bar in the case of profiled material. On the other hand, the noise level rises appreciably if rollers are used that have a hard, smooth covering, so that no reduction in noise level can be expected in the case of profiled material.

The present invention is basically concerned with obviating the above-mentioned drawbacks and with feeding the bars in such a way that they do not vibrate or strike any walls, which would produce noise.

This objective is attained in accordance with the invention by arranging that the four rollers constituting a group are disposed in two pairs with an endless belt extending around each pair so that the free lengths of the belts facing each other engage and support the bars. It is further provided, in accordance with the invention, that each group of rollers includes a frame having lower and upper parts, with the guide rollers mounted thereon in such a way that the rollers in each pair can move resiliently relative to each other, the arrangement being such that the upper part of the frame is mounted on the lower part in such a way that the former can be swung upward to open the frame, the connection between the two supports being located eccentrically relative to the feed axis of the bar in such a way that the center of gravity of the upper part of the frames moves beyond its hinge point during the opening or closing movement of the frame. In an advantageous form of construction, a storage space for the bars is provided on the opening side of the frame.

The advantages achieved by means of this invention are due, in particular, to the fact that while being processed on automatic screw cutting machines the bar stock can be supported with little noise at any rotational speed, and adjusting the apparatus to suit the diameter of the bars can be dispensed with.

Figure 2:
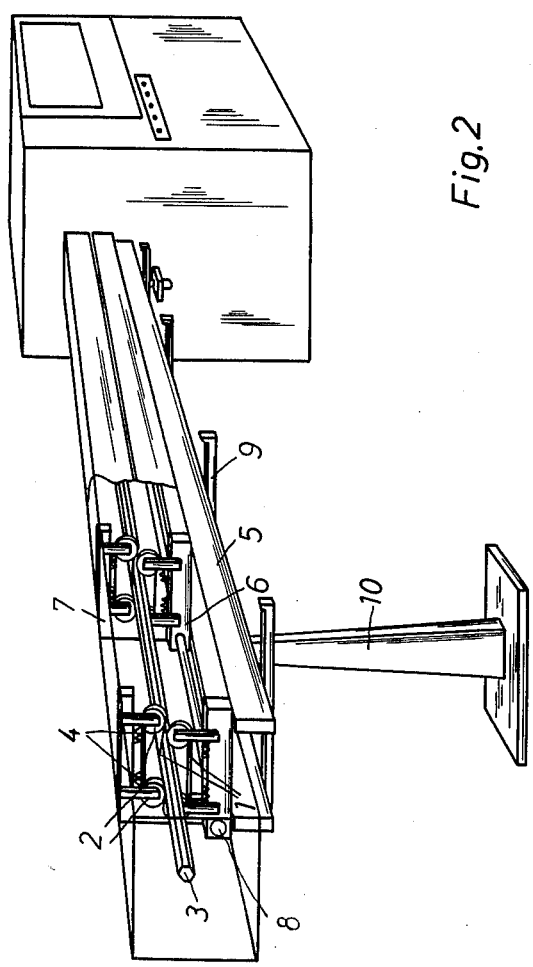

An example of a form of construction of the apparatus made in accordance with this invention is described in the following text based on the accompanying drawings, in which FIG. 1 shows, in cross-section, a low noise level bar-feeding apparatus that is suitable for mounting on automatic screw-cutting machines with their own material feed system; and FIG. 2 shows schematically and in partial cross section the apparatus connected to an automatic screw-cutting machine.

Referring to the drawings, there are one or more roller groups, in each of which there are two endless belts 1. Each belt extends around a pair of laterally spaced upright rollers 2 having parallel axes. One pair of rollers is above and slightly offset axially relative to the other, or lower, pair of rollers in the same group. The lower length of the upper belt between the upper rollers, and the upper length of the lower belt between the lower rollers engage the top and bottom, respectively, of a bar 3 between them. Compression springs 4 urge apart the free ends of the rollers' bearing supports, which are pivoted to lower and upper parts 6 and 7 of a frame. The springs hold the belts under tension and serve to dissipate any vibration that occurs as the bar rotates and slides axially across the belts.

The lower part 6 of the frame is mounted transversely on a main support 5, and one end of part 6 is provided with a hinge pin 8, on which the lower end of the upper part 7 of the frame is pivoted. This upper part is in the general shape of an inverted letter L. The location of the hinge pin at one end of lower part 6 is such that the center of gravity of the upper part is to the left of the pin in FIG. 2 when the frame is closed, and to the right of the pin when the frame is open, whereby the upper part is in stable position when in either of its two positions. The opening angle of the frame is set at about 30°.

Finally, a storage channel or rack for a supply of bars is provided at the opening side of the frame by attaching laterally projecting members 9 to that side of main support 5.

One end of this apparatus is supported by a screw-cutting machine, and the other or free end is mounted on a stand 10 of adjustable height.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for damping noise in bar-feeding devices of automatic screw-cutting machines, especially for bars with a polygonal profile, the apparatus comprising at least one group of rollers composed of an upper pair of laterally spaced upright rollers and a lower pair of laterally spaced upright rollers, means supporting all of the rollers with their axes parallel to one another, an endless belt extending around each pair of rollers, the lower length of the upper belt and the upper length of the lower belt being unsupported between the rollers and adapted to engage the top and bottom of a rotating and axially moving bar between them extending across the belts, whereby to support the rotating bar as it moves said lower and upper lengths of the belts in opposite directions, and resilient means urging the rollers in each pair laterally away from each other to maintain said belts taut.

2. Apparatus according to claim 1, in which said roller-supporting means include pivotally supported bearing members, and said resilient means are compression springs urging the bearing members for each pair of rollers away from each other.

3. Apparatus according to claim 1, including a frame having a lower part supporting the lower pair of rollers and an upper part supporting the upper pair of rollers, and means pivotally connecting said frame parts together in such a way that the upper part can be swung upward and laterally from a position in which its center of gravity is at one side of said connecting means to a position in which its center of gravity is at the opposite side of said connecting means, whereby to open the frame.

4. Apparatus according to claim 3, in which said pivotal connecting means is located outwardly beyond the lower pair of rollers.

* * * * *